Patented June 30, 1942

2,288,322

UNITED STATES PATENT OFFICE 2,288,322

MOLDABLE COPAL COMPOSITION AND METHOD OF MAKING THE SAME

Birger W. Nordlander, Schenectady, N. Y., assignor to General Electric Company, a corporation of New York No Drawing. Application September 27, 1939, Serial No. 296,815

5 Claims. (Cl. 106—242)

This invention relates to resinous moldable compositions and methods of preparing the same from the class of natural resins known as the copals by treating the natural resins with a polyvalent metal oxide and asbestos.

An object of the invention is to prepare moldable compositions from a copal-metal oxide complex with an asbestos filler which can be hot molded in a manner similar to that employed in molding phenol-aldehyde condensation products.

Another object of the invention is to provide a moldable copal resin complex which, like the phenolic resin molding compounds, can be extracted from the mold while hot without distortion of the molded piece.

A further object is to provide products of the kind described having surface finish, hardness, and heat resistance of high order, and outstanding arc and water resistance.

Another object of the present invention is to provide products of the kind described having high creepage resistance, that is, having practically no tendency to "track" or carbonize when an arc is allowed repeatedly to shoot across their surface.

A further object is to provide an improved method of compounding the resin and the modifying ingredients to produce a heat-setting composition capable of being hot molded and hot extracted.

The foregoing objects and other objects, which will become apparent to one skilled in the art from the following description of the invention, are attained by incorporating with a copal resin asbestos and a polybasic metal oxide considerably in excess of the amount corresponding to the acid value of the resin used.

Various natural resins, especially those which remain sticky when mixed with drying oils, have been treated heretofore with metal oxides to neutralize the free acids and raise the softening temperature of the natural resin thus making it more adaptable for varnish manufacture. Natural resins have also been used in the manufacture of molded articles wherein the article was molded hot and extracted from the mold after the latter had cooled. However, I believe I am the first to discover that copal resins can be treated in such a way that compositions containing the treated resin can be molded in the same manner as thermo-setting synthetic resins to produce a molded article having sufficient rigidity at molding temperatures to permit immediate extraction of the article from the mold after the curing or molding operation is complete.

Unlike many of the natural resins, the copals appear to be unique in their ability to form satisfactory molded articles having high-temperature rigidity when treated with polyvalent metal oxides. Rosin, for example, when treated with a metal oxide, such as zinc oxide, in accordance with my methods, shows very little tendency to become thermo-setting and the resultant compound does not harden appreciably when cured in a mold. The resinous material known in the trade as "Vinsol" behaves in much the same manner as rosin. The copals, on the other hand, are readily rendered hot-moldable by my treatment.

It is believed that the different behavior of copals as compared with the other mentioned resins may be due to the fact that the former resins contain acidic complexes of polybasic character that will allow cross-tying to take place on reaction with multi-valent active oxides by the formation of metal salts of the acids, whereas the other mentioned resins essentially contain monobasic acids which are unable to form such cross-ties.

In order to obtain products having characteristic properties, such as set forth under the objects of my invention, it is desirable to use fairly acidic copal resins and to maintain a predetermined relationship between the resin and the active metal oxide employed. In all cases the active metal oxide component must be considerably in excess of that which may be calculated as necessary to neutralize (react with) the free acids present in the natural resin. The choice of filler has been found to be of particular importance. While most fillers, such as mica, wood flour, cotton flock, etc., are "inactive" in the sense that they apparently do not participate in the reaction, certain fillers, such as asbestos, were found to be "active," aiding the curing of the resin. When an active filler is used, the proportion of resin plus metal oxide in the compound should bear a certain predetermined relationship to the amount of filler employed in order that the best molding results may be obtained.

Although any of the copals may be used for the purposes of my invention, those resins known as Manila copals, melting around 110° to 120° C. and having fairly high acid values of about 130 to 150, have proved particularly suitable whether in the form of dust, chips, or nubs. The copals ordinarily need not be purified, although for certain purposes the presence of some types of impurities may not be desirable. When treated with the oxide, the various grades exhibit varying properties as to speed of curing, etc., so that the compounding technique should be varied to suit the particular grade or type of resin used. The chips and dust are on the whole faster curing than the nubs and therefore need not be heat treated with the oxide for as long a time prior to molding. Hence, a more thorough mixing of the filler, oxide and resin is possible with the nubs. The chips and dust, however, give a harder cure with the same amount of zinc oxide.

Various oxides of polyvalent metals or mixtures thereof may be used in treating the copal resin, such as the oxides of lead, zinc, calcium, and magnesium. I prefer zinc oxide (ZnO) primarily because its slower reaction rate permits of better control of the reaction during compounding, and also because the zinc salts of the acidic constituents of the resin formed during the reaction are more hydrophobic than the corresponding calcium and magnesium salts. In this connection I have found that the activity of various commercial grades of zinc oxides may vary. Although any of the commercial grades may be used, I prefer those known in the market as "Horsehead XX103" and "Horsehead XX55."

In order that my invention may be better understood by those skilled in the art to which it relates, the following illustrative examples are given:

Example A

| Formula | Parts by weight |
| --- | --- |
| Copal chips | 40 |
| S. W. asbestos | 48 |
| Zinc oxide | 10 |
| Calcium oxide | 2 |

Copal nubs may be substituted for copal chips in this example without changing the formula, although the resulting compound cures more slowly than that obtained by using the chips. Copal dust also may be used. The compound thus produced cures considerably faster and requires less active oxide than one made with the chips. An alkyd resin, obtained, for example, by reacting two moles glycerol with three moles phthalic anhydride until an acid value of 125 to 150 has been reached, may be substituted for a part of the copal in the foregoing formula, thereby raising the tensile strength of the end-product.

Using a suitable mixing device, such as a Banbury mixer or a pair of rolls such as used for compounding rubber compositions, the above components are compounded according to the following technique, which has been found to produce the best results.

Keeping the temperature of the mixer at or above the softening point of the resin, the resin is first introduced therein. When the resin has melted, the filler, in the example, asbestos, is added and thoroughly incorporated with the melted resin. The active oxide, in the example, zinc oxide and calcium oxide, thereupon is added. A slow setting-up effect is noticeable during the first two steps, but with the addition of the oxide a very rapid hardening effect commences.

The total time of milling varies, depending on the type of resin, filler and active oxide used. As stated, asbestos is an "active" filler which definitely aids the oxides in setting up the resin, and markedly decreases the milling time. Mica, cotton flock, wood flour, etc., are inactive fillers and the corresponding compounds containing the same oxide content require much longer milling time. The components in Example A may be milled on mixing rolls, for example, as follows:

Temperature of mill _____ 140° to 145° C.
Filler plus resin _____ 6 to 7 minutes
Filler plus resin plus active oxide _ 2 to 3 minutes
Total time of milling _____ 8 to 10 minutes At the end of this operation, the compound is taken off the rolls in the form of a stiff sheet which is subsequently ground to powder form.

It is important, at least when using an active filler, that the compounding be carried out in the described order, so that the active filler is thoroughly coated with the resin before the oxide is added. If the components are added in a different order, the physical characteristics of the product, such as water resistance and tensile strength, are lowered considerably.

Some compounds may require a pre-cure before molding in order to obtain optimum physical properties in the molded product without having to cure the compound for a prolonged time in the mold. However, with most grades of copal resins, pre-cure has little effect and may even exert some deteriorating action in leading to the formation of a porous product having inferior properties. The compound made as aforedescribed requires no pre-cure and may be molded directly. Curing for 5 to 10 minutes in the mold at about 150° C. is sufficient. The piece may be ejected hot from the mold without distortion.

If, for any reason, an improvement in the properties proves necessary (increased heat resistance, for example), an after-cure may be given the molded piece without altering its dimensions by keeping it in an oven at 125° to 150° C. until the desired improvement has been effected. For ordinary applications, the compound prepared in accordance with the above example requires no after-cure.

The following is an example of a typical molding composition falling within the scope of my invention in which zinc oxide is the only converting agent used:

Example B

| Formula | Parts by weight |
| --- | --- |
| Copal dust | 40 |
| Asbestos | 50 |
| Zinc oxide | 10 |

After the resin has become sufficiently soft on the rolls, the asbestos is added and mixing or kneading continued at a temperature of from 140° to 145° C. for five minutes, after which the zinc oxide is incorporated. The oxide-filler-resin mixture is removed from the rolls after a total mixing time of seven minutes including the time of mixing the filler and resin. The resultant stiff sheet may be ground and the ground material molded at a temperature of 150° for ten minutes. The compound has a very good flow and the molded article retains its shape upon removal from the mold while hot.

Wood flour may be substituted in whole or in part for the asbestos. This substitution of an inactive filler for an active filler requires an increase in the amount of oxide used in order that the time of hot mixing or rolling may be kept within practical limits. A compound containing wood flour suitable for my purposes is the following:

Example C

| Formula | Parts by weight |
| --- | --- |
| Copal chips | 39.9 |
| Wood flour | 44.2 |
| Zinc oxide | 15.9 |

After the resin has melted on the rolls, the wood flour is added and mixed for from five to six minutes at a temperature of 130° to 135° C. The oxide is then incorporated and the mixing continued for about ten to fifteen minutes. At the end of this time, the material is removed from the rolls as a stiff sheet and may be ground preparatory to molding. This compound has a hard cure, good flow during molding and the molded article has good molding-temperature form retention and good mechanical strength.

When ordinary mixing rolls are used in compounding the molding mixture, the temperature of the rolls is usually slightly above the melting point of the resin and adequate mixing of the ingredients may be obtained from a total rolling time of the order of 5 to 10 minutes. However, when a Banbury mixer is used, both a higher temperature and a longer mixing time are required primarily because of the difference in operation between the two mixing devices. The best temperature and mixing time for the Banbury mixer readily may be determined by one skilled in the art.

As stated previously, any alkyd resin having high acid value advantageously may be substituted for part of the copal. Such acidic resins, including those prepared from a polyhydric alcohol such as glycerine or pentaerythritol and a polybasic acid such as phthalic acid or its anhydride, are more fully described in a copending application Serial No. 296,814, of Birger W. Nordlander and Ira A. Hurst, filed concurrently herewith, and assigned to the same assignee as the present application. The following is an example of such a compound in which 25% of the total resin content is an alkyd resin of acid value between 125 and 150:

*Example D*

| Formula | Parts by weight |
| --- | --- |
| Copal chips | 30 |
| Alkyd resin | 10 |
| Asbestos | 45 |
| Zinc oxide | 15 |

In compounding these ingredients, the filler is mixed with the melted mixed resins for six minutes on rolls held at a temperature of from 140° to 145° C. and the zinc oxide kneaded into the filler-resin mixture for from two to three minutes. This compound gave a hard cure and had very good form retention at molding temperatures.

I have found that desirable results also may be obtained by the addition of an alkyd resin of high acidic value prepared, for instance, by reacting glycerine with an amount of phthalic anhydride in excess of the stoichiometrical amount of glycerine taken. The free acid in the acidic alkyd resin apparently reacts with the oxide in a manner similar to that of the free acid in the copal resin to produce a final compound containing a complex reaction product.

The substitution of an acidic alkyd resin for part of the copal results in an improved flow as compared with a similar compound containing only the copal resin and compounded under identical conditions. The arc resistance and tensile properties of the final product also are improved by such substitution although the water resistance is decreased slightly when the alkyd resin predominates. Suitable phenolic resins also may be incorporated, although such additions will reduce materially the arc- and creepage-resistance of the product.

In determining the proper balance between the copal resin, or a mixture of copal and acidic alkyl resin, and the basic oxide and filler, certain general aspects should be considered. From the point of view of molding practice, a satisfactory hot molding compound should flow freely during the earlier part of the molding cycle and, subsequently, cure rapidly, that is, become permanently set so that in a relatively short time the molded piece may be ejected hot without distorting.

In the molding compounds considered herein, made from either the copal resin or a mixture of such resin with acidic alkyd resin, a part of the curing occurs on the rolls during the compounding, another part during the pre-curing step, if used, and the final part in the mold during the molding cycle. By controlling the extent of the cure effected by the first step or steps, the above two requisites may be developed to a satisfactory degree in the compounds. In this connection, it is important from the standpoint of obtaining a product suitable for commercial molding operations that an adjusted proportion of resin, oxide and filler be taken. Otherwise, the compound may either flow well but cure too slowly, or flow poorly and cure too fast.

It is believed that the heat-hardening process or cure involves a reaction between acidic groups situated on the resin component and the basic groups present not only on the active oxide but also on the filler if the latter is of the "active" type. Depending on whether the filler is "inactive" or "active" the cure of the compound will therefore be governed by different relationships. When an inactive filler is used, there can be only one regulating factor of significance, namely, the ratio of the oxide to the resin, since the filler then acts merely as a diluent. This ratio will depend upon the type of resin or resins and the kind and subdivision of the oxide. In general, when zinc oxide is employed with an inactive filler, the presence of from 20 to 50% of the oxide based on the resin will yield satisfactory molding compositions. However, a content of from 35 to 50% is preferred as, within these proportions of oxide, good flow combined with hard cure are obtained. When lead or calcium oxides are used in place of the zinc oxide or in combination with the zinc oxide, these proportions are correspondingly lower since both the calcium and lead oxides, on the whole, have been found to be more reactive than zinc oxide. It is sometimes desirable to add the required calcium or lead oxide to the powdered or ground material just before subjecting this material to the molding operation.

A somewhat different situation exists when an active filler is used. Since both the oxide and the filler then participate in the conversion of the resin, it is possible with given types of resin, oxide and filler to make many different combinations, all of which will give molding compounds exhibiting similar molding characteristics. Thus, with a compound containing about 50 or 60% asbestos based on the total ingredients present, from about 6 to 14% zinc oxide is preferred to produce the desired hardening or curing of the resin in the hot mold. It will be noted that these percentages are all in terms of the total composition. In terms of the resin content, the active oxide used will preferably amount to at least 20% of the resin when the asbestos is used as a filler constituting from 50% to 60% of the total composition.

It is obvious, of course, to those skilled in the molding art that the filler content of any molding composition will influence the tensile strength and other physical or electrical characteristics of the molding composition. The ingredients should therefore be so proportioned as to produce a molded article having the desired characteristics for any particular application. If desired, small quantities of water-absorbing or bonding materials may be added to the molding powder prior to hot pressing. Such materials include Portland cement, unslaked lime, plaster of Paris, or the like.

The products made in accordance with the described process possess excellent surface finish, hardness, arc-, creepage-, heat-, water- and solvent-resistance and have good tensile strength. The arc-resistance and creepage-resistance are of outstanding order. The material shows no apparent tendency to "track." The water absorption is extremely low.

In order to illustrate the excellent water-resistance of the molded products which may be obtained in accordance with my invention, I list below some figures showing the amount of water that a molded piece resulting from Example C absorbed on immersion in water at room temperature:

| Time, hours | Percent weight increase |
|---|---|
| 16 | 0.027 |
| 40 | 0.058 |
| 64 | 0.08 |
| 92 | 0.10 |
| 185 | 0.23 |
| 327 | 0.36 |

The piece was left in water for 2270 hours. At the end of this period, it was still in a perfect physical condition.

The above figures are typical for the products which may be prepared in accordance with my invention from compounds utilizing copal resins as the binding agent and asbestos as the filler. When using cellulosic, fibrous fillers instead of asbestos, the water resistance is somewhat lower. The tensile properties are improved by the substitution of an alkyd resin for part of the copal. On account of the unusual properties combined in the products of the present invention, these products may be used to advantage in the electrical insulation field.

What I claim as new and desire to secure by Letters Patent of the United States, is:

1. A composition of matter consisting of the heat reaction product of a fused acidic copal resin, at least 20% by weight of a polyvalent metal oxide based on the weight of the resin, and asbestos at an elevated temperature.

2. A hot-moldable composition comprising the heat reaction product of copal resin having an acid number of at least 130, acidic alkyd resin, polyvalent metal oxide and asbestos, said polyvalent metal oxide being present in an amount of at least 20 per cent by weight based on the weight of the combined resin content.

3. A composition of matter comprising the product of reaction of an acidic copal resin, from 6 to 14 per cent by weight of zinc oxide, and from 60 to 50 per cent by weight of an active filler comprising asbestos.

4. An article of manufacture comprising the hot-molded product of reacting a copal resin having an acid value of at least 130 with asbestos and at least 20 per cent of a reactive polyvalent oxide at a temperature above the melting point of said copal resin.

5. An article of manufacture comprising the hot-molded product of reaction of an acidic copal resin, from 6 to 14 per cent by weight of zinc oxide, and from 60 to 50 per cent by weight of an active filler comprising asbestos.

BIRGER W. NORDLANDER.